United States Patent
Amin

(10) Patent No.: US 9,688,270 B2
(45) Date of Patent: Jun. 27, 2017

(54) VEHICLE FUEL MAINTENANCE SYSTEMS AND METHODS

(71) Applicant: Ford Global Technologies, LLC, Dearborn, MI (US)

(72) Inventor: Md Shahnoor Amin, Rochester, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/866,415

(22) Filed: Sep. 25, 2015

(65) Prior Publication Data

US 2017/0088124 A1    Mar. 30, 2017

(51) Int. Cl.
| | | |
|---|---|---|
| *B60L 9/00* | (2006.01) | |
| *B60W 20/50* | (2016.01) | |
| *B60W 20/40* | (2016.01) | |
| *G07C 5/08* | (2006.01) | |

(52) U.S. Cl.
CPC ............ *B60W 20/50* (2013.01); *B60W 20/40* (2013.01); *G07C 5/0808* (2013.01); *B60W 2420/00* (2013.01); *B60W 2560/04* (2013.01); *Y10S 903/902* (2013.01)

(58) Field of Classification Search
CPC ... Y02E 60/50; B60L 11/1809; H01M 16/003
USPC ........................................... 701/22; 180/65.1
See application file for complete search history.

(56) References Cited

U.S. PATENT DOCUMENTS

| | | |
|---|---|---|
| 8,090,520 B2 | 1/2012 | Tate, Jr. et al. |
| 8,768,599 B2 | 7/2014 | Blanchard et al. |
| 9,008,880 B2 | 4/2015 | Sangameswaran et al. |
| 2004/0036601 A1 | 2/2004 | Obradovich |
| 2009/0029197 A1* | 1/2009 | Hibino ............... B60L 1/003 429/415 |
| 2013/0151056 A1 | 6/2013 | Nakano |
| 2014/0114511 A1 | 4/2014 | Sangameswaran et al. |
| 2015/0066259 A1 | 3/2015 | Thompson |

FOREIGN PATENT DOCUMENTS

| | | |
|---|---|---|
| CN | 101289059 B | 6/2010 |
| DE | 102008003076 A1 | 7/2008 |

OTHER PUBLICATIONS

Hoberock, L. L., "A Survey of Longitudinal Acceleration Comfort Studies in Ground Transportation Vehicles," Research Report 40: Department of Transportation, Jul. 1976, 54 pages.
"Scald Injury Prevention Educator's Guide," American Burn Association, http://www.ameriburn.org/Preven/ScaldInjuryEducator%27sGuide.pdf, pp. 1-20, Accessed Dec. 14, 2015.
"The McDonald's Hot Coffee Case," Consumer Attorneys of California, https://www.caoc.org/?pg=facts, pp. 1-2, accessed Dec. 16, 2015.

* cited by examiner

*Primary Examiner* — Gertrude Arthur Jeanglaud
(74) *Attorney, Agent, or Firm* — James Dottavio; McCoy Russell LLP

(57) ABSTRACT

A method comprises on board a hybrid vehicle and executed by a vehicle controller on board the hybrid vehicle, determining a pH based on a pH sensor positioned in a fuel system; and in response to a first condition comprising the pH being less than a first threshold pH, disabling an electric motor and propelling the hybrid vehicle with an engine. In this way, a risk of engine degradation due to fuel degradation can be reduced.

20 Claims, 6 Drawing Sheets

VEHICLE FUEL MAINTENANCE SYSTEMS AND METHODS

BACKGROUND AND SUMMARY

Plug-in hybrid electric vehicles (PHEV's) have higher capacity batteries as compared to hybrid electric vehicles (HEV's) and primarily use electricity to power electric motors as their principal means of propulsion. For many PHEV drivers, the combustion engine is rarely operated, for instance, only when the battery state of charge (SOC) is almost exhausted. Unused fuel inside the fuel tank may degrade with age due to accumulation of acidity and waxing. Conventional PHEV fuel maintenance modes force the engine on after a certain fuel age is reached in order to consume all of the fuel inside the tank.

The inventors herein have recognized potential issues with the above approach. Namely, because fuel quality is not directly measured or determined, forcing the engine on after a certain fuel age is reached may prematurely consume undegraded fuel with unnecessary engine starts. For example, the degree of fuel degradation with time can depend on several factors such as the initial fuel quality, fuel type, engine age, and the like. Conversely, prior to reaching a certain fuel age, fuel degradation may be more severe than anticipated, and forcing the engine on in order to consume the severely aged and degraded fuel may cause unnecessary damage to the engine.

One approach which at least partially addresses the above issues includes a method, comprising on board a hybrid vehicle and executed by a vehicle controller on board the hybrid vehicle, determining a pH based on a pH sensor positioned in a fuel system; and in response to a first condition comprising the pH being less than a first threshold pH, disabling an electric motor and propelling the hybrid vehicle with an engine.

In another embodiment, a method for a hybrid vehicle having a controller may comprise providing the controller with executable instructions to: determine a fuel pH based on a fuel pH sensor; and execute a first fuel maintenance mode in response to the fuel pH being less than a first threshold pH for a first threshold time.

In another embodiment, a hybrid vehicle system may comprise: an engine; an electric motor; a fuel system; a pH sensor positioned in the fuel system; and a controller, with executable instructions to determine a fuel pH based on a fuel pH sensor, and execute a first fuel maintenance mode in response to the fuel pH being less than a first threshold pH for a first threshold time.

In this way, a technical result may be achieved in that prematurely consuming undegraded fuel and unnecessary fuel starts may be reduced. Furthermore, engine robustness may be increased because combustion of severely degraded fuel during engine operation can be reduced. Further still, reducing unnecessary fuel starts can increase fuel economy, and increasing engine robustness may reduce customer complaints. The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically shows an example of a vehicle propulsion system.

DETAILED DESCRIPTION

Figure 1:
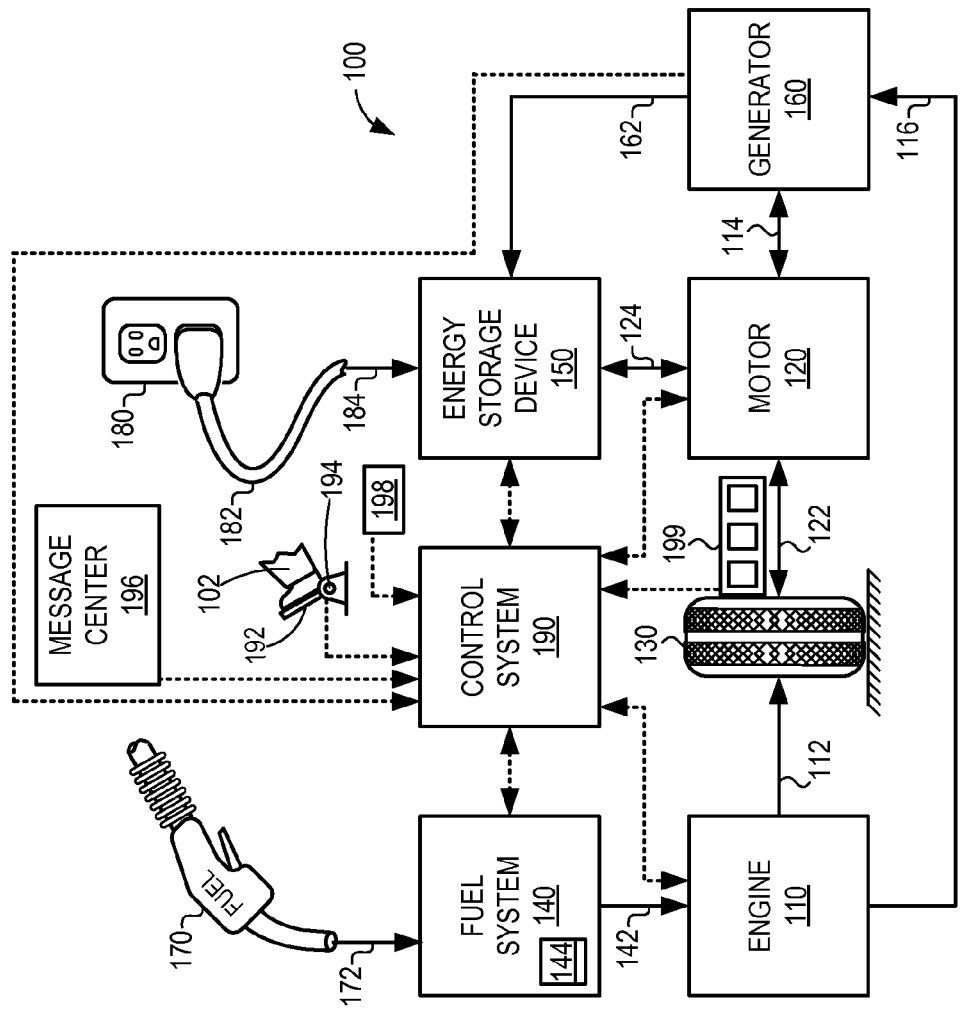
Figure 2:
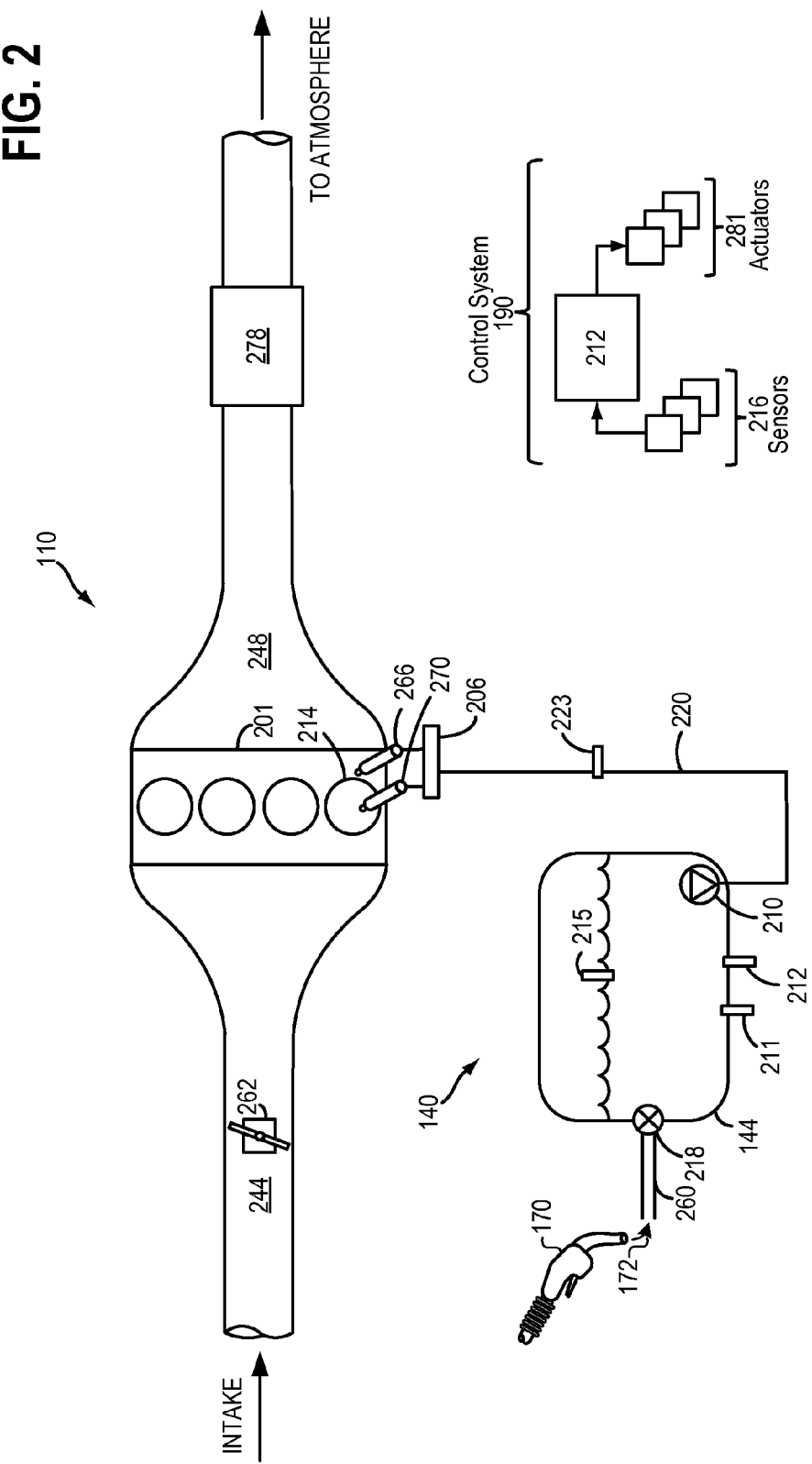
FIG. 2 shows a schematic depiction of the engine and fuel system of the vehicle propulsion system of FIG. 1.
Figure 3:
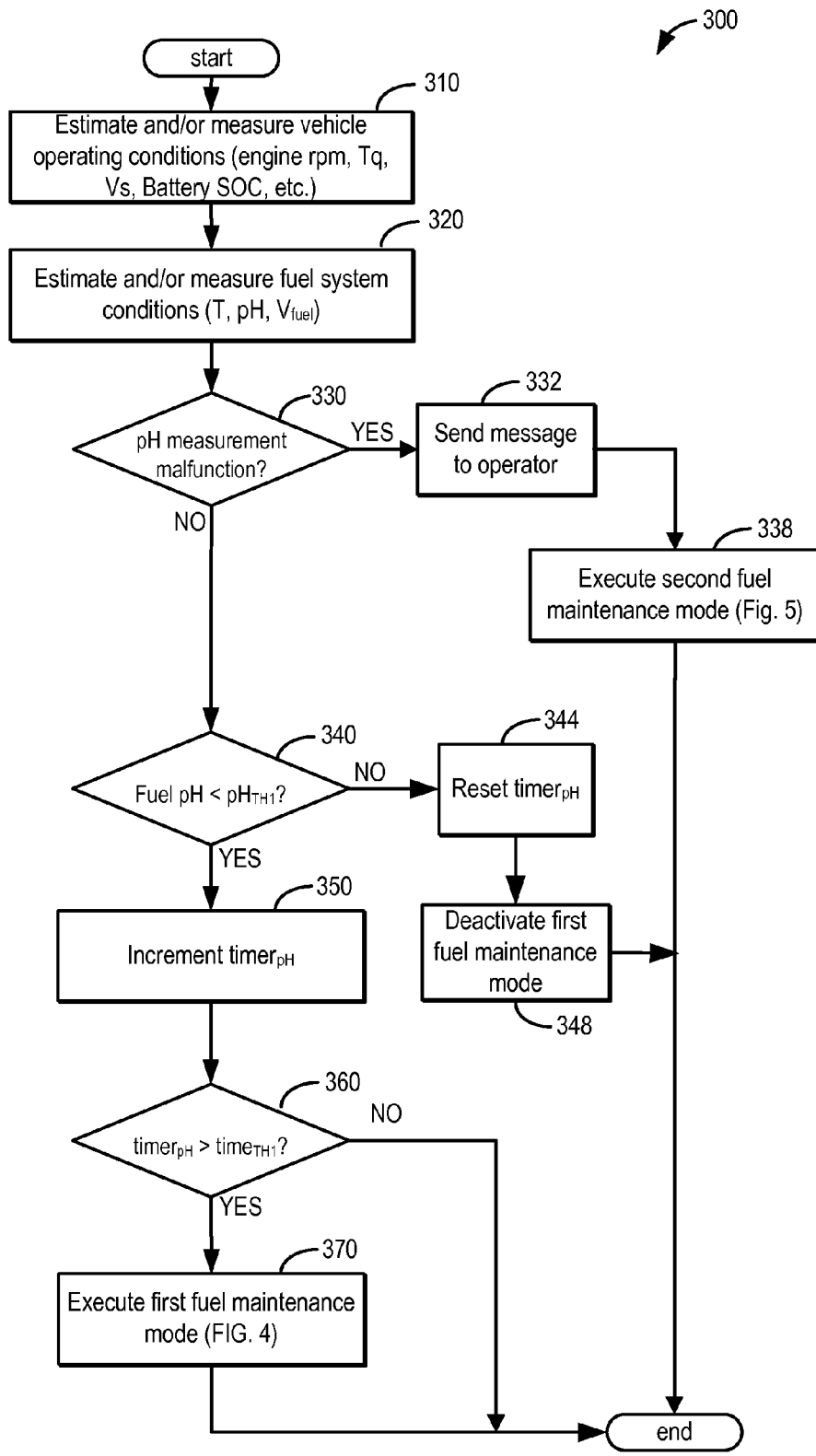
FIGS. 3-5 show a flow chart of an example method for operating the vehicle propulsion system of FIG. 1, including operating the engine and fuel system of FIG. 2.
Figure 4:
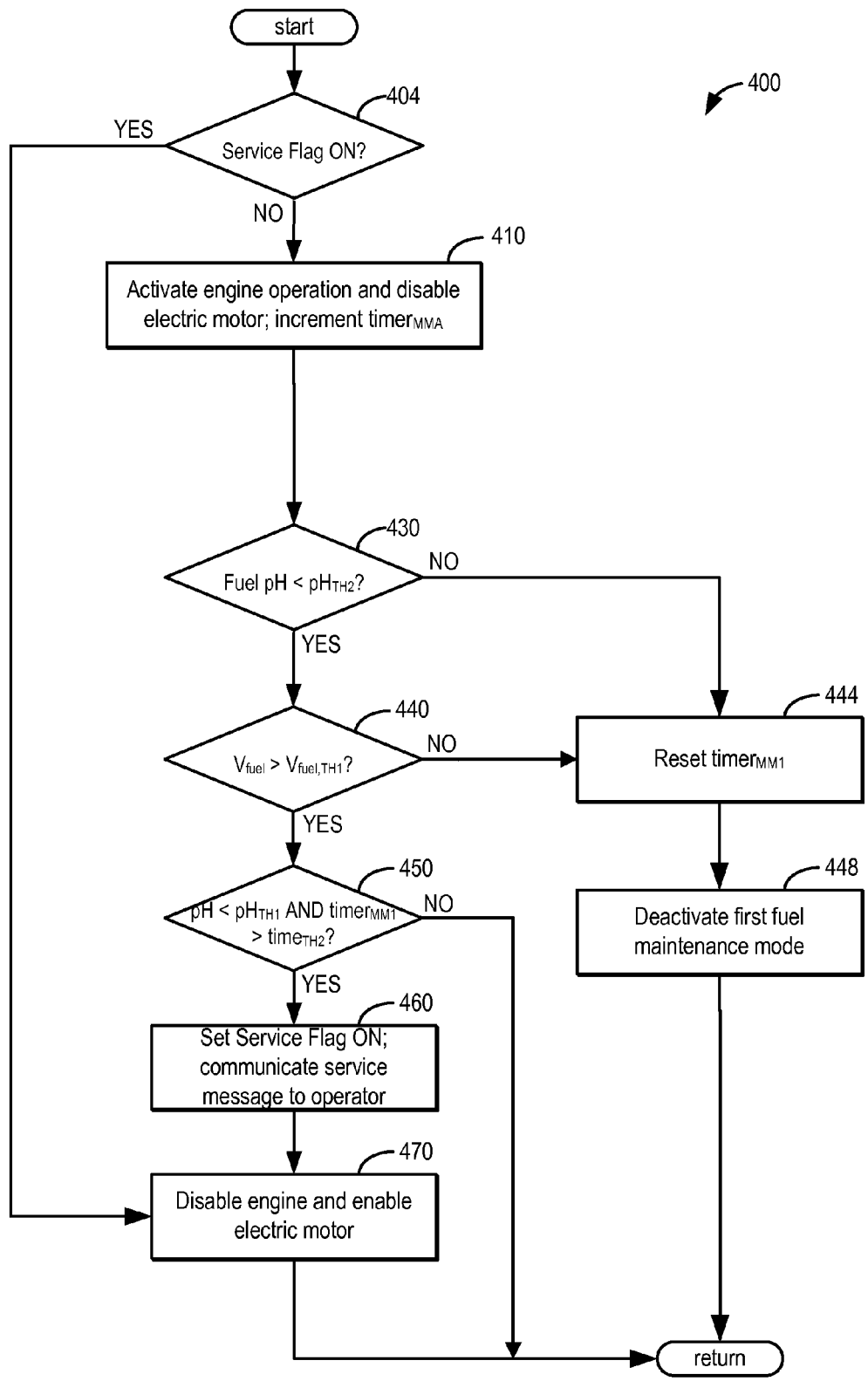
Figure 5:
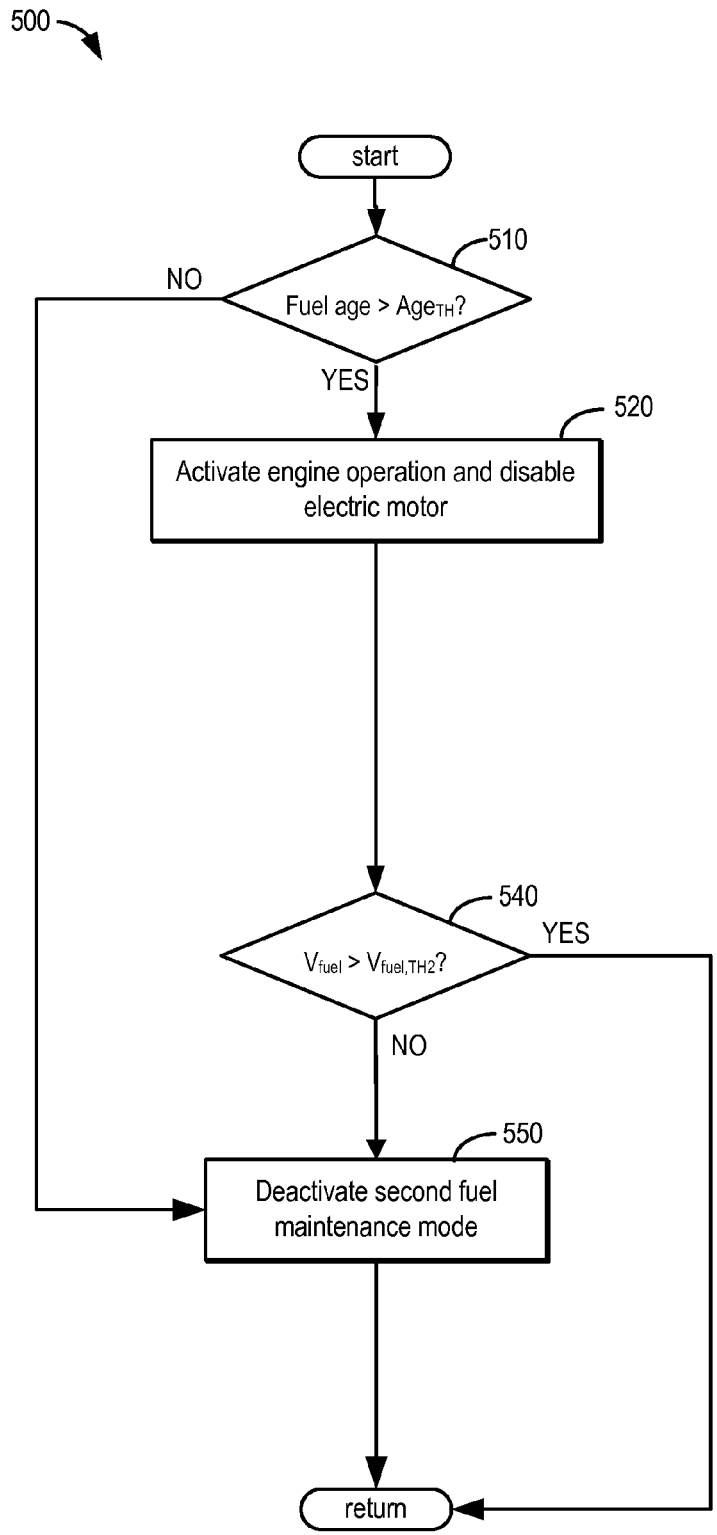
Figure 6:
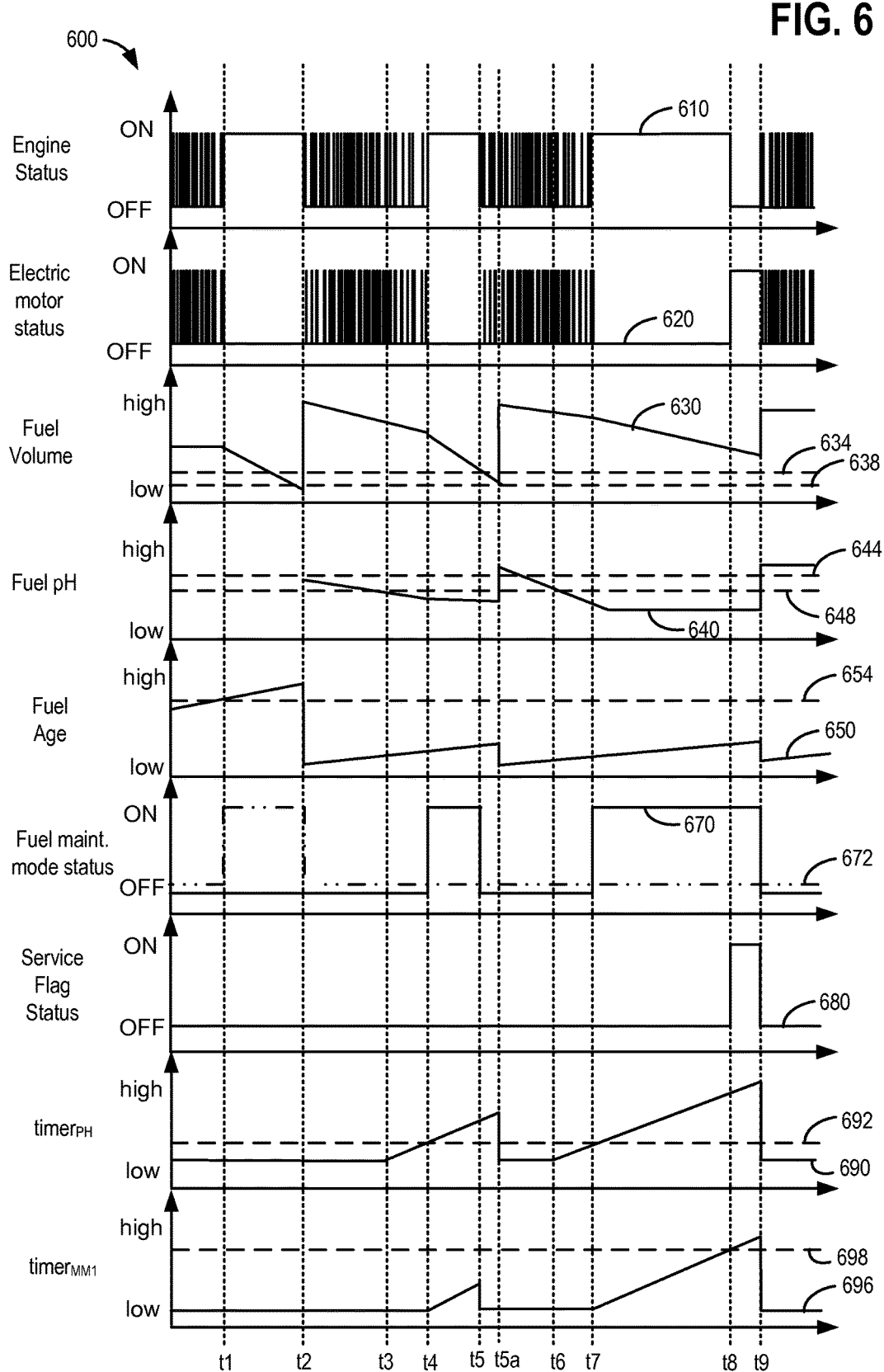
FIG. 6 shows an example timeline for operating the vehicle propulsion system of FIG. 1, including operating the engine and fuel system of FIG. 2.

The present description relates to systems and methods for improving fuel maintenance for an engine on board a vehicle. The fuel system may comprise a pH sensor, which may be used in combination or alone with additional sensors to directly monitor fuel quality. An example vehicle propulsion system is illustrated in FIG. 1, and the internal combustion engine and fuel system of the vehicle propulsion system is depicted in FIG. 2. FIGS. 3-5 illustrate flow charts for a method executable by a controller on board the vehicle for maintaining fuel quality. FIG. 6 is an example timeline illustrating operation of the engine to maintain fuel quality during various engine operating conditions.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150 such as a battery. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel tanks 144 for storing fuel on-board the vehicle. For example, fuel tank 144 may store one or more fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output.

The engine output may be utilized to propel the vehicle as indicated by arrow 112 or to recharge energy storage device 150 via motor 120 or generator 160. In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIGS. 3-4, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. As another example, control system 190 may receive input from one or more sensors, and in response, may enable or disable operation of the engine 110 or motor 120.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (state-of-charge).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it will be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. Furthermore, in the case of a new vehicle or in response to a vehicle with a newly installed exhaust particulate filter, vehicle propulsion system 100 may be refueled by receiving a fuel doped with an ash-producing additive. In some embodiments, fuel tank 144 may be configured to store the fuel (and/or doped fuel) received from fuel dispensing device 170 until it is supplied to engine 110 for combustion.

This plug-in hybrid electric vehicle, as described with reference to vehicle propulsion system 100, may be configured to utilize a secondary form of energy (e.g., electrical energy) that is periodically received from an energy source that is not otherwise part of the vehicle.

The vehicle propulsion system 100 may also include a message center 196, ambient temperature/humidity sensor 198, and a roll stability control sensor, such as a lateral and/or longitudinal and/or yaw rate sensor(s) 199. The message center may include indicator light(s) and/or a text-based display in which messages are displayed to an operator, such as a message requesting an operator input to start the engine, as discussed below. The message center may also include various input portions for receiving an operator input, such as buttons, touch screens, voice input/recognition, etc. In an alternative embodiment, the message center may communicate audio messages to the operator without display. In one example, control system 190 may display messages at message center 196 regarding fuel quality and fuel maintenance mode status. For instance, if fuel quality is determined to be poor (e.g., if fuel degradation is high), the message center 196 may display the current fuel quality measure (e.g., fuel pH), and may alert the operator using aural and/or visual cues that fuel maintenance mode has been activated. Further examples of monitoring fuel quality and executing fuel maintenance modes are described below.

Turning now to FIG. 2, it shows a schematic diagram of a multi-cylinder engine in accordance with the present disclosure. As depicted in FIG. 1, internal combustion engine 110 includes cylinders 214 coupled to intake passage 244 and exhaust passage 148. Intake passage 244 may include throttle 262. Exhaust passage 248 may include emissions control device 278. Emission control device 278 may be a three way catalyst (TWC), NOx trap, various other emission control devices, or combinations thereof. Control system 190, including controller 212, may receive signals from various sensors 216, and additional sensors shown in FIGS. 1 and 2, and output signals to various actuators 281, including additional actuators shown in FIGS. 1 and 2. Cylinders 214 may be configured as part of cylinder head 201. In FIG. 2, cylinder head 201 is shown with 4 cylinders in an inline configuration. In some examples, cylinder head 201 may have more or fewer cylinders, for example six cylinders. In some examples, the cylinders may be arranged in a V configuration or other suitable configuration.

Cylinder head 201 is shown coupled to fuel system 140. Cylinder 214 is shown coupled to fuel injectors 266 and 270. Although only one cylinder is shown coupled to fuel injectors, it is to be understood that all cylinders 214 included in cylinder head 201 may also be coupled to one or more fuel injectors. In this example embodiment, fuel injector 266 is depicted as a direct fuel injector and fuel injector 270 is depicted as a port fuel injector. Although only one direct injector and one port injector are shown in FIG. 2, it is to be understood that engine 110 may comprise more than one direct injector and more than one port fuel injector. Each fuel injector may be configured to deliver a specific quantity of fuel at a specific time point in the engine cycle in response to commands from controller 212. One or more fuel injectors may be utilized to deliver combustible fuel to cylinder 214 during each combustion cycle. The timing and quantity of fuel injection may be controlled as a function of engine operating conditions.

Fuel system 140 includes fuel tank 144. Fuel tank 144 may include a fuel, such as gasoline, diesel fuel, or a gasoline-alcohol blend (e.g. E10, E85, M15, or M85). Fuel tank 144 may include pH sensors 211 and 223, temperature sensor 213, and liquid level sensor 215. In one example, liquid level sensor may comprise a float sensor. Furthermore, the fuel volume in the fuel tank may be determined from the measured liquid level.

pH sensors 211 and 223 may be used to measure the fuel pH in the fuel tank and in fuel line 220 upstream of fuel injectors, respectively. Fuel pH sensor 211 may be positioned at the bottom of fuel tank 144 so that fuel pH can be determined when fuel level in the fuel tank is low. An additional fuel pH sensor 223 may be positioned in fuel line 220 upstream of fuel injectors to provide another measure of fuel pH in fuel system 140. pH measurements from fuel pH sensors 211 and 223 may be transmitted to controller 212. Controller 212 may use one or more pH measurements; for example pH measurements from sensors 211 and 223 may be averaged to determine an aggregate fuel pH. As another example, fuel pH may be determined using fuel pH sensor 223 in the event that fuel pH sensor 211 is malfunctioning, and vice versa. Accordingly, having more than one fuel pH sensor may increase fuel pH measurement reliability, increase fuel economy, and may reduce measurement error. In the case where the fuel pH measurements from sensors 211 and 223 differ by more than a threshold difference, the controller 212 may use the fuel pH measurement from fuel pH sensor 211 since the fuel tank 144 contains a larger volume of fuel than fuel line 220. The threshold difference may be 10% or another calibratable value.

Fuel may be supplied from fuel tank 144 to cylinders 214 of engine 110 via fuel line 220, fuel rail 206, and fuel injectors 266 and 270. Fuel may be supplied from fuel tank 144 by operating fuel lift pump 210. Fuel line 220 may be coupled to a lower portion of fuel tank 144 in order draw fuel from fuel tank 144 via fuel lift pump 210. Fuel may be delivered to fuel line 220 and fuel rail 206, where fuel may be directly injected into cylinder 214 via fuel injector 266.

In one example, fuel rail 206 may comprise a DI fuel rail for direct injecting fuel via one or more DI fuel injectors 270 and a PFI fuel rail for port injection of fuel via one or more PFI fuel injectors 266. Furthermore, a DI fuel pump may be provided upstream of DI fuel rail for delivering pressurized fuel to DI fuel rail. Although not shown in FIG. 2, DI fuel pump may be a high pressure fuel pump comprising a solenoid activated inlet check valve, a piston, and an outlet check valve for delivering high pressure fuel to DI fuel rail. Injection of fuel via DI fuel injection pump may lubricate the piston of liquid DI fuel pump, thereby reducing pump wear and degradation and reducing pump noise, volume, and harshness.

Fuel tank 144 is shown coupled to refueling conduit 260. Refueling conduit 260 may be coupled to fuel tank 144 via tank access valve 218. Fuel may be dispensed into fuel tank 144 via fuel dispenser 170 into refueling conduit 260 and tank access valve 218.

Turning now to FIGS. 3-5, it illustrates an example flow chart for method 300, comprising fuel maintenance methods 400 and 500, of operating an engine system and a fuel system. Methods 300, 400, and 500 may be executed as part of a control strategy by controller 212 of control system 190 on board the vehicle.

Method 300 begins at 310 where engine operating conditions such as engine on condition (EOC), engine temperature, engine torque, engine load, engine speed (RPM), vehicle speed (Vs), and the like are measured and/or estimated. At 320, method 300 estimates and/or measures fuel system conditions such as fuel temperature, fuel pH, and fuel volume (e.g., or fuel level). As described above, fuel pH may be determined from one or more fuel pH sensors positioned in the fuel system 140. Multiple fuel pH measurements in time from a single fuel pH sensor may also be used. Where multiple fuel pH measurements are made (e.g., multiple measurements in time, and/or from multiple pH sensors), an aggregate fuel pH may be determined from the multiple fuel pH measurements. In one example, the multiple fuel pH measurements may be averaged. In other examples, an aggregate pH value may be determined by a weighted average or other means from the multiple pH measurements. For example, in the case where a pH sensor is positioned in the fuel tank and a second pH sensor is positioned in a fuel line (e.g., fuel line 220), the pH value measured by the fuel tank sensor may be weighted higher than the fuel line sensor because the volume of fuel in the fuel tank is greater than the volume of the fuel in the fuel line. In the case where one of the fuel pH sensors is malfunctioning, the fuel pH measurement from the non-malfunctioning fuel pH sensor may be used.

Method 300 continues at 330 where it determines if a pH measurement malfunction exists. A pH measurement malfunction may be determined when a reliable fuel pH measurement cannot be obtained. For example, all fuel system pH sensors malfunctioning or being inoperative may be indicative of a pH measurement malfunction. Accordingly the fuel acidity and fuel quality may not be directly monitored. If a pH measurement malfunction exists, method 300 continues at 332 where a notification of the malfunctioning pH measurement may be sent to the vehicle operator via message center 196. Method 300 continues at 338 where a second fuel maintenance mode may be executed (see description for FIG. 5). Returning to FIG. 3 after 338, method 300 ends.

Turning now to FIG. 5, it illustrates a method for executing a second fuel maintenance method 500. Method 500 begins at 510 where it determines if a fuel age is greater than a threshold age, $Age_{TH}$. The fuel age may represent the time elapsed since the last vehicle fuel refill. Because a pH measurement malfunction is detected at 330 of method 300, a reliable fuel pH measurement cannot be obtained. Thus, fuel quality may be inferred using fuel age. When the fuel age is greater than $Age_{TH}$, in the absence of fuel pH measurements, the fuel quality may be inferred to be degraded. In one example, $Age_{TH}$ may be 18 months. Thus, if the vehicle's fuel has not been refilled for 18 months, the quality of the fuel remaining in the fuel tank 144 may be degraded if allowed to remain in the fuel tank. In other words, the fuel may be approaching degraded fuel quality (e.g., acidified below a first threshold pH, $pH_{TH1}$, and comprising waxy buildup, and the like) and can cause damage to the engine components if it is allowed to remain in the fuel tank for significantly longer than $Age_{TH}$.

If fuel age>$Age_{TH}$, method 500 continues at 520, where the controller 212 activates engine operation and disables the electric motor. In this way, the aged fuel (e.g., aged beyond $Age_{TH}$) is consumed via combustion inside the engine to propel the vehicle. Method 500 continues at 540 it determines if the fuel volume, $V_{fuel}$, is greater than a second threshold fuel volume $V_{fuel,TH2}$. If the fuel volume is greater than $V_{fuel,TH2}$, method 500 returns to method 300 after 338, where method 300 ends. As long as the pH measurement malfunction condition at 330 and the fuel age condition (fuel age>$Age_{TH}$) at 510 are met, the second fuel maintenance mode will be enabled until the fuel volume decreases below $V_{fuel,TH2}$. $V_{fuel,TH2}$ may correspond to a threshold fuel volume below which the remaining fuel volume may not appreciably damage engine components if allowed to degrade. In one example, $V_{fuel,TH2}$ may correspond to an empty fuel tank. In other words, the second fuel maintenance mode may operate the engine until all the aged fuel (fuel age>$Age_{TH}$) is consumed before allowing the electric motor to operate. Accordingly, the risk of engine damage and engine degradation resulting from contact of engine components with aged fuel may be reduced. If $V_{fuel}<V_{fuel,TH2}$ at 540, method 500 continues at 550, where the second fuel maintenance mode is deactivated. Following 550, method 500 returns to method 300 after 338 where method 300 ends.

Returning to 510, if the fuel age is determined to be less than $Age_{TH}$, method 500 continues to 550, where the second fuel maintenance mode is deactivated and method 500 returns to method 300 after 338 where method 300 ends.

Returning to FIG. 3 at 330, if a pH measurement malfunction does not exist, method 300 continues at 340 where it determines if the fuel pH is less than a first threshold fuel pH, $pH_{TH1}$. The first threshold fuel pH may correspond to a fuel pH below which long-term damage to engine components can occur, resulting in increased engine maintenance costs and reduced engine reliability. As an example, the first threshold fuel pH may be a pH of 6. The first threshold fuel pH may be higher or lower depending on the fuel type or fuel blend since fuel characteristics can determine fuel quality stability, including the rate of fuel acidification over time.

If the fuel pH is less than $pH_{TH1}$, method 300 continues at 350 where a timer, $timer_{PH}$, is incremented. $Timer_{PH}$ may indicate a duration when the fuel pH is less than $pH_{TH1}$. At 360, method 300 determines if the duration when the fuel pH has been below $pH_{TH1}$ is more than a first threshold time, $time_{TH1}$. In other words, method 300 determines if $timer_{pH}>time_{TH}$. In one example, $time_{TH1}$ may correspond to 60 minutes. Operating the engine with low pH fuel (e.g., fuel $pH<pH_{TH1}$) for durations greater than $time_{TH1}$ may degrade engine components. For example, aluminum engine components may react with acid to form hydrogen gas and aluminum chloride. The highly combustible hydrogen gas can cause sporadic engine misfiring during engine operation, resulting in significant damage to the engine valves and cylinders. Furthermore, aluminum chloride and other salt products may clog fuel injectors and cause solid build-up in various areas of the engine system, blocking fuel flow. If $timer_{PH}>time_{TH1}$ at 360, method 300 continues at 370 where the first fuel maintenance mode is executed. As such, when the fuel $pH<pH_{TH1}$ for a duration greater than $time_{TH1}$, the first fuel maintenance mode is executed by controller 212.

Turning now to FIG. 4, it illustrates a first fuel maintenance mode method 400. Method 400 beings at 404 where it determines if a service flag is ON (refer to step 460 of method 400). If the service flag is not ON, method 400 continues at 410 where it disables the electric motor and activates engine operation to begin consuming fuel in fuel tank 144. Additionally, method 400 at 410 increments a maintenance mode 1 timer, $timer_{MM1}$, which indicates the duration for which the first fuel maintenance mode has been operating.

Method 400 continues at 430 where it determines if the fuel pH is less than a second threshold pH, $pH_{TH2}$. The second threshold pH, $pH_{TH2}$, may represent a fuel pH above which fuel quality is high enough where a risk of engine damage caused by fuel degradation may be reduced. In one example, $pH_{TH2}$ may be a pH of 7 (e.g., neutral pH). The fuel pH being less than $pH_{TH2}$ is indicative of the fuel quality being lower (e.g., more acidic than $pH_{PH2}$) and a risk of engine damage caused by combustion of degraded fuel in the engine being higher. If the fuel $pH<pH_{TH2}$, method 400 continues at 440 where it determines if $V_{fuel}$ is greater than a first threshold fuel volume, $V_{fuel,TH1}$. $V_{fuel,TH1}$ may represent a fuel volume below which a risk of engine damage caused by combustion of acidic fuel (e.g., fuel $pH<pH_{TH2}$) is reduced. For instance, if $V_{fuel}<V_{fuel,TH1}$, the volume of fuel remaining in the fuel tank is lower, and thus combusting the volume of fuel remaining in the fuel tank may have a reduced risk of causing damage to engine components. In one example, $V_{fuel,TH1}$ may include 1 gallon of fuel.

Accordingly, if either fuel pH is not less than $pH_{TH2}$ at 430 or $V_{fuel}$ is not greater than $V_{fuel,TH1}$ at 440, method 400 continues at 444 and 448 where $timer_{MM4}$ is reset to 0 and the first fuel maintenance mode is deactivated, respectively. In other words, at 430 since fuel pH is not less than $pH_{TH2}$ the fuel pH may high enough such that a risk of fuel combustion causing engine degradation is reduced. As one example, fuel pH may have increased since activating a first fuel maintenance mode because the fuel tank may have been partially or fully refilled. In another example, addition of basic additives (e.g., additives having pH >7) to the fuel tank may increase fuel pH, the basic additives reacting with and neutralizing excess hydronium ions in the fuel mixture. Raising the pH of the fuel mixture in the fuel tank may reduce a risk of engine and fuel system damage resulting from combustion of acidic (e.g., lower pH) fuel. Alternately at 440, since $V_{fuel}$ is not greater than $V_{fuel,TH1}$, a risk of fuel combustion causing engine degradation is reduced.

If $V_{fuel} > V_{fuel,TH1}$ at 440, method 400 continues at 450 where it determines if the fuel pH $<$pH$_{TH1}$ and if timer$_{MM1}$ is less than a second threshold time, time$_{TH2}$. If fuel pH$<$pH$_{TH1}$, then the fuel pH has not risen above pH$_{TH1}$ since the first fuel maintenance mode was activated. The second threshold time, time$_{TH2}$, may represent a duration of operating the first fuel maintenance mode beyond which further consumption of fuel in the fuel tank (e.g., where $V_{fuel} > V_{fuel,TH1}$) may increase a risk of degrading the engine. For instance, operating the vehicle in a first fuel maintenance mode (e.g., where the engine operation is activated and the electric motor is disabled) for a duration of time$_{TH2}$ may indicate that a certain volume of fuel with pH$<$pH$_{TH1}$ has been combusted in the engine. Further combustion of fuel with pH$<$pH$_{TH1}$ in the engine may thus increase a risk of engine damage, reducing engine robustness. In one example, time$_{TH2}$ may comprise 36 hours.

If pH$<$pH$_{TH1}$ and timer$_{MM1}<$time$_{TH2}$ at 450, method 400 continues at 460 where a service flag is set ON, and a service message is sent to the vehicle operator. The service flag being ON may indicate that further operation of the first fuel maintenance mode may increase a risk of engine damage. As such, the service message sent to the vehicle operator (e.g., via message center 196), may indicate that the quality of the remaining fuel in the fuel tank is degraded (e.g., the fuel pH is low), and that the vehicle requires service to purge the fuel from the fuel system. Method 400 continues at 470 from 460, or from 404 when the service flag is ON, where the engine is disabled and the electric motor is enabled. Thus, when the service flag is ON, the controller 212 propels the vehicle using the electric motor and does not propel the vehicle with the engine, in order to reduce a risk of damage to the engine due to combustion of degraded fuel. After 470, method 400 returns to method 300 after 370, where method 300 ends.

When the service flag is set ON, the vehicle operator may have the vehicle serviced at a vehicle service center, dealership, or another appropriate facility to purge the degraded fuel from the fuel system 140. After servicing the vehicle in this manner, the service flag may be set OFF and the vehicle may be propelled with either the electric motor or the engine (after refueling).

Returning to FIG. 3 at 360, if timer$_{PH}$ is not less than time$_{TH1}$ at 360, then method 300 ends. Returning to FIG. 3 at 340, if the fuel pH is not less than pH$_{TH1}$ then method 300 continues at 344 where the timer$_{PH}$ is reset to zero. After 344, method 300 continues at 348 where the first fuel maintenance mode is deactivated. Following 344, method 300 ends.

The fuel maintenance mode parameters, pH$_{TH1}$, pH$_{TH2}$, time$_{TH1}$, time$_{TH2}$, $V_{fuel,TH1}$, $V_{fuel,TH2}$, and Age$_{TH}$ may depend on the type (e.g., grade) of fuel. For example, the first threshold pH (and the other fuel maintenance mode parameters) may change if the vehicle fueled with ethanol blends vs. diesel or gasoline. The threshold fuel pH values corresponding to fuel type (and other fuel maintenance mode parameter values by fuel type) may be stored in an Engine Control Module residing in the control system 190. The Engine Control Module may also comprise data regarding the percentage compositions of fuel blends within the fuel system 140. Consequently, threshold fuel pH (and the other fuel maintenance mode parameters) may be adapted to the fuel type. Furthermore, fuel maintenance mode parameters may depend on vehicle operator driving characteristics which can be learned and accounted for by controller 212 over time.

Accordingly, in one example, a method may comprise: on board a hybrid vehicle and executed by a vehicle controller on board the hybrid vehicle, determining a pH based on a pH sensor positioned in a fuel system; and in response to a first condition comprising the pH being less than a first threshold pH, disabling an electric motor and propelling the hybrid vehicle with an engine. Additionally or alternatively, the first condition may further comprise, the pH being less than the first threshold pH for a first threshold time. Additionally or alternatively, the method may further comprise, in response to the pH being greater than a second threshold pH, enabling the electric motor and propelling the hybrid vehicle with one or more of the electric motor and the engine. Additionally or alternatively, the method may further comprise, in response to a fuel volume decreasing below a first threshold volume, enabling the electric motor and propelling the hybrid vehicle with one or more of the electric motor and the engine. Additionally or alternatively, the method may further comprise, in response to the pH being less than the first threshold pH and the first condition being satisfied for a duration greater than a second threshold time, disabling the engine and propelling the hybrid vehicle with the electric motor. Additionally or alternatively, the method may further comprise, in response to a second condition including a fuel age being greater than a threshold age, disabling the electric motor and propelling the hybrid vehicle with the engine. Additionally or alternatively, the method may further comprise, determining the fuel age based on an elapsed time from a last fuel refill. Additionally or alternatively, the second condition may further comprise a pH sensor malfunctioning. Additionally or alternatively, the method may further comprise, in response to the second condition and the fuel volume decreasing below a second threshold volume, enabling the electric motor and propelling the hybrid vehicle with one or more of the electric motor and the engine.

In another example, a method for a hybrid vehicle having a controller may comprise providing the controller with executable instructions to: determine a fuel pH based on a fuel pH sensor; and execute a first fuel maintenance mode in response to the fuel pH being less than a first threshold pH for a first threshold time. Additionally or alternatively, executing the first fuel maintenance mode may comprise disabling an electric motor and propelling the hybrid vehicle with an engine. Additionally or alternatively, the method may further comprise, deactivating the first fuel maintenance mode in response to the fuel pH increasing above a second threshold pH. Additionally or alternatively, the method may further comprise, deactivating the first fuel maintenance mode in response to a fuel volume decreasing below a first threshold volume. Additionally or alternatively, the method may further comprise, disabling the engine and propelling the hybrid vehicle with the electric motor in response to executing the first fuel maintenance mode for a duration exceeding a second threshold time and the fuel pH being below the first threshold pH. Additionally or alternatively, the method may further comprise, executing a second fuel maintenance mode in response to a malfunction of the fuel pH sensor.

Turning now to FIG. 6, it illustrates an example timeline 600 for operating a vehicle, such as a PHEV. Timeline 600 includes timelines for engine status 610, electric motor status 620, fuel volume 630, fuel pH 640, fuel age 650, first fuel maintenance mode status 670, second fuel maintenance mode status 672, service flag status 680, timer$_{PH}$ 690, and timer$_{MM1}$ 696. Also illustrated are V$_{fuel,TH1}$ 634, V$_{fuel,TH2}$ 638, pH$_{TH1}$ 648, pH$_{TH2}$ 644, Age$_{TH}$ 654, time$_{TH1}$ 692 and time$_{TH2}$ 698.

Prior to time t1, the vehicle may be operating in hybrid mode where the engine and electric motor are periodically used in combination or alternately to propel the vehicle. Fuel volume remains relatively constant because of the higher fuel efficiency of the vehicle and because of the frequent operation of the electric motor. Both first and second fuel maintenance modes are off, and timer$_{PH}$ and timer$_{MM1}$ remains at zero since the first fuel maintenance mode is not operating. Notably, the fuel age is high, just below Age$_{TH}$, indicating that the fuel has remained in the fuel tank for a long duration since the last fuel refill. Furthermore, a pH measurement malfunction exists since the pH measurement is unobtainable. As an example, one or more fuel system pH sensors may be malfunctioning.

At time t1, the fuel age increases above Age$_{TH}$. In response to the pH measurement malfunction and the fuel age>Age$_{TH}$, the second fuel maintenance mode is activated as indicated by the second fuel maintenance mode status 672 switching from OFF to ON.

Accordingly, the electric motor is disabled and the engine is used to propel the vehicle at t1. Between time t1 and time t2, fuel volume steadily decreases as fuel is combusted in the engine, and the age of the remaining fuel in the fuel tank continues to increase.

The second fuel maintenance mode operates until time t2, when responsive to the fuel volume decreasing below V$_{fuel,TH2}$ 638, the second fuel maintenance mode is deactivated. At time t2, the vehicle operator refills the fuel tank, as indicated by the sudden increase in fuel volume 630. In response to the fuel refilling, the fuel age 650 is reset.

After time t2, first and second fuel maintenance modes are not active, and the vehicle is returned to hybrid operation. Between time t2 and time t3, the fuel volume slowly decreases due to fuel consumption from sporadic engine operation. In addition, as the fuel begins to age, the fuel pH decreases due to formation of acid byproducts arising from fuel degradation processes. At time t3, the fuel pH decreases below pH$_{TH1}$ 648, and accordingly, timer$_{PH}$ 690 begins to increase. At time t4, timer$_{PH}$ increases above time$_{TH1}$ 692 and in response, the first fuel maintenance mode status 670 switches from OFF to ON. During operation of the first fuel maintenance mode, timer$_{MM1}$ 696 begins to increase, and the electric motor is disabled and the vehicle is propelled by the engine. Accordingly, between times t4 and t5, fuel volume 630 decreases more rapidly than between times t2 and t4. At time t5, the fuel volume decreases below V$_{fuel,TH1}$ 634, and in response, the first fuel maintenance mode is deactivated since the remaining volume of fuel in the fuel tank is lower and the risk of engine damage may be reduced. At time t5, the timer$_{MM1}$ is also reset to zero. At time t5a, the vehicle operator refills the fuel tank as shown by the sharp increase in fuel volume 630. As a result, the fuel pH rises above pH$_{TH1}$ and timer$_{PH}$ is reset to zero. Furthermore, the fuel age 650, which had been steadily increasing since time t2 (the time of the last fuel refill), is reset to 0.

After time t5, first and second fuel maintenance modes are not active, and the vehicle is returned to hybrid operation. Between time t5a and time t6, the fuel volume slowly decreases due to fuel consumption from sporadic engine operation. In addition, as the fuel begins to age, the fuel pH decreases due to formation of acid byproducts arising from fuel degradation processes. At time t6, the fuel pH decreases below pH$_{TH1}$ 648, and accordingly, timer$_{PH}$ 690 begins to increase. At time t7, timer$_{PH}$ increases above time$_{TH1}$ 692 and in response, the first fuel maintenance mode status 670 switches from OFF to ON. During operation of the first fuel maintenance mode, timer$_{MM1}$ 696 begins to increase, and the electric motor is disabled and the vehicle is propelled by the engine. Accordingly, between times t7 and t8, fuel volume 630 decreases more rapidly than between times t5a and t7. Furthermore, fuel pH 640 decreases below pH$_{TH1}$ 648. At time t8, the timer$_{MM1}$ 696 increases above time$_{TH2}$ 698 while the fuel pH remains below pH$_{TH1}$, and in response, the service flag status 680 is set ON and a message is sent to the vehicle operator via message center 196 indicating that fuel system service is required. Additionally, at time t8 the engine is disabled and the vehicle is propelled by the electric motor in order to reduce a risk of engine damage caused by combustion of degraded fuel.

At time t9, the vehicle operator has the vehicle serviced at an appropriate vehicle service facility to purge the fuel from the fuel system and refill the fuel tank with fresh fuel. As a result, at t9, the service flag status is reset to OFF, the first fuel maintenance mode status is switched OFF, timer$_{PH}$ is reset to 0, timer$_{MM1}$ is reset to 0, and the fuel volume is increased sharply. After time t9, the vehicle is operated in hybrid mode once again.

Accordingly, in one example, a hybrid vehicle may comprise: an engine; an electric motor; a fuel system; a pH sensor positioned in the fuel system; and a controller, with executable instructions to, determine a fuel pH based on a fuel pH sensor, and execute a first fuel maintenance mode in response to the fuel pH being less than a first threshold pH for a first threshold time. Additionally or alternatively, executing the first fuel maintenance mode comprises disabling the electric motor and propelling the hybrid vehicle with the engine. Additionally or alternatively, the hybrid vehicle may further comprise executable instructions at the controller to deactivate the first fuel maintenance mode in response to the fuel pH increasing above a second threshold pH. Additionally or alternatively, the hybrid vehicle may further comprise executable instructions at the controller to deactivate the first fuel maintenance mode in response to a fuel volume being less than a first threshold volume. Additionally or alternatively, the hybrid vehicle may further comprise disabling the engine and propelling the hybrid vehicle with the electric motor in response to executing the first fuel maintenance mode for a duration beyond a threshold duration.

In this way, the embodiments described herein may aid in mitigating prematurely consuming fuel that is not yet degraded and in reducing unnecessary fuel starts because fuel pH, a measure of fuel quality, may be directly monitored. Furthermore, engine robustness may be increased because combustion of severely degraded fuel during engine operation can be reduced by monitoring fuel pH. Further still, the methods and systems described herein, comprising monitoring fuel pH, may help in reducing unnecessary fuel starts and can thereby increase fuel economy. Further still, the methods and systems described herein may also help in increasing engine robustness which may reduce customer complaints.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interruptdriven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
on board a hybrid vehicle and executed by a vehicle controller on board the hybrid vehicle,
measuring a pH of fuel by a pH sensor positioned in a fuel supply system supplying fuel to an engine of the hybrid vehicle; and
in response to a first condition comprising the pH being less than a first threshold pH, disabling an electric motor and propelling the hybrid vehicle with the engine.

2. The method of claim 1, wherein the first condition further comprises the pH being less than the first threshold pH for a first threshold time.

3. The method of claim 2, further comprising, in response to the pH being greater than a second threshold pH, enabling the electric motor and propelling the hybrid vehicle with one or more of the electric motor and the engine.

4. The method of claim 3, further comprising, in response to a fuel volume decreasing below a first threshold volume, enabling the electric motor and propelling the hybrid vehicle with one or more of the electric motor and the engine.

5. The method of claim 4, further comprising, in response to the pH being less than the first threshold pH and the first condition being satisfied for a duration greater than a second threshold time, disabling the engine and propelling the hybrid vehicle with the electric motor.

6. The method of claim 5, further comprising, in response to a second condition including a fuel age being greater than a threshold age, disabling the electric motor and propelling the hybrid vehicle with the engine.

7. The method of claim 6, further comprising determining the fuel age based on an elapsed time from a last fuel refill.

8. The method of claim 7, wherein the second condition further includes a pH sensor malfunctioning.

9. The method of claim 8, further comprising, in response to the second condition and the fuel volume decreasing below a second threshold volume, enabling the electric motor and propelling the hybrid vehicle with one or more of the electric motor and the engine.

10. A method for a hybrid vehicle having a controller, comprising providing the controller with executable instructions to:
measure a fuel pH by a fuel pH sensor positioned in a fuel system supplying fuel to an engine of the hybrid vehicle; and
execute a first fuel maintenance mode in response to the fuel pH being less than a first threshold pH for a first threshold time.

11. The method of claim 10, wherein executing the first fuel maintenance mode comprises disabling an electric motor and propelling the hybrid vehicle with the engine.

12. The method of claim 11, further comprising deactivating the first fuel maintenance mode in response to the fuel pH increasing above a second threshold pH.

13. The method of claim 12, further comprising deactivating the first fuel maintenance mode in response to a fuel volume decreasing below a first threshold volume.

14. The method of claim 13, further comprising disabling the engine and propelling the hybrid vehicle with the electric motor in response to executing the first fuel maintenance mode for a duration exceeding a second threshold time and the fuel pH being below the first threshold pH.

15. The method of claim 14, further comprising executing a second fuel maintenance mode in response to a malfunction of the fuel pH sensor.

16. A hybrid vehicle, comprising:
an engine;
an electric motor;
a fuel system fluidically coupled to the engine;
a pH sensor positioned in the fuel system; and
a controller, with executable instructions to:
measure a fuel pH by a fuel pH sensor, and
execute a first fuel maintenance mode in response to the fuel pH being less than a first threshold pH for a first threshold time.

17. The hybrid vehicle of claim 16, wherein executing the first fuel maintenance mode comprises disabling the electric motor and propelling the hybrid vehicle with the engine.

18. The hybrid vehicle of claim 17, further comprising executable instructions at the controller to deactivate the first fuel maintenance mode in response to the fuel pH increasing above a second threshold pH.

19. The hybrid vehicle of claim 18, further comprising executable instructions at the controller to deactivate the first fuel maintenance mode in response to a fuel volume being less than a first threshold volume.

20. The hybrid vehicle of claim 19, further comprising disabling the engine and propelling the hybrid vehicle with the electric motor in response to executing the first fuel maintenance mode for a duration beyond a threshold duration.

* * * * *